(12) United States Patent
Sutterlin

(10) Patent No.: US 11,068,334 B2
(45) Date of Patent: Jul. 20, 2021

(54) METHOD AND SYSTEM FOR ENHANCING COMMUNICATION RELIABILITY WHEN MULTIPLE CORRUPTED FRAMES ARE RECEIVED

(71) Applicant: Echelon Corporation, Santa Clara, CA (US)

(72) Inventor: Philip H. Sutterlin, Saratoga, CA (US)

(73) Assignee: Echelon Corporation, Santa Clara, CA (US)

( * ) Notice: Subject to any disclaimer, the term of this patent is extended or adjusted under 35 U.S.C. 154(b) by 280 days.

(21) Appl. No.: 13/843,056

(22) Filed: Mar. 15, 2013

(65) Prior Publication Data

US 2014/0281829 A1 Sep. 18, 2014

(51) Int. Cl.
| | |
|---|---|
| *G06F 11/08* | (2006.01) |
| *G06F 11/00* | (2006.01) |
| *H04L 1/18* | (2006.01) |
| *H04L 1/00* | (2006.01) |

(52) U.S. Cl.
CPC ............ *G06F 11/08* (2013.01); *H04L 1/1841* (2013.01); *H04L 1/0045* (2013.01); *H04L 1/0061* (2013.01)

(58) Field of Classification Search
CPC ......... H04L 1/201; H04L 1/20; H04L 1/1841; H04L 1/0045; H04L 1/0061; H03M 13/09; G06F 11/08
See application file for complete search history.

(56) References Cited

U.S. PATENT DOCUMENTS

| | | | | |
|---|---|---|---|---|
| 6,314,433 | B1* | 11/2001 | Mills et al. | 714/758 |
| 6,421,387 | B1* | 7/2002 | Rhee | 375/240.27 |
| 2003/0053435 | A1* | 3/2003 | Sindhushayana et al. | 370/342 |
| 2003/0139140 | A1* | 7/2003 | Chen et al. | 455/67.1 |
| 2010/0115374 | A1* | 5/2010 | Kirkby | 714/758 |
| 2010/0269005 | A1* | 10/2010 | Budampati et al. | 714/746 |

OTHER PUBLICATIONS

Henri Dubois-Ferrière, et al., "Packet Combining in Sensor Networks," SenSys '05, San Diego, California, USA, Nov. 2-4, 2005, (14 pages).

* cited by examiner

*Primary Examiner* — Justin R Knapp
(74) *Attorney, Agent, or Firm* — Nicholson De Vos Webster & Elliott, LLP

(57) ABSTRACT

An exemplary communications receiver includes an error detector for determining whether a first and second received frame is corrupted, each frame comprising of a plurality of bits. The receiver includes a filter for determining whether the second received corrupted frame should be recovered. The receiver includes a frame generator for generating a recovered frame based on the plurality of bits of the first and second corrupted frame and frame information of the second corrupted frame, in response to the error detector determining that the first and second received frames are corrupted and the filter determining that the second received frame should be recovered.

30 Claims, 7 Drawing Sheets

METHOD AND SYSTEM FOR ENHANCING COMMUNICATION RELIABILITY WHEN MULTIPLE CORRUPTED FRAMES ARE RECEIVED

FIELD OF THE INVENTION

The invention relates to the field of communications receivers, and more particularly embodiments of the invention relate to recovering a received corrupted frame.

BACKGROUND

In a conventional data communications system, packet reliability is enhanced by inclusion of an error detection mechanism (e.g., a CRC) where a corrupted data frame is discarded to avoid unintended actions. Reliability of intended message delivery is improved by sending multiple copies of a particular frame. Copies of the original frame may either be sent in response to lack of a positive acknowledgement of an error-free delivery, as blindly repeated frames, or according to some other algorithm. Whichever duplicate frame transmission algorithm is implemented, successful message delivery is still dependent on reception of a complete error-free frame.

To reduce inefficiency and latency that result from sending multiple complete frames, forward error correction (FEC) is often employed. With FEC, redundant information is added to each frame in such a way that a target receiver can correct some data errors prior to performing full frame error detection. When the communications channel is impaired beyond the ability of the FEC mechanism it is common to employ retransmission of the entire frame in an attempt to provide error-free message delivery.

A limitation of the above duplicate transmission technique occurs when the communications channel characteristics are such that one or more bits of each repeated frame are in error, even after FEC. In such a scenario, message delivery is still unsuccessful. Prior art methods to overcome this limitation include:
  Adding more redundant information to the transmitted frame (e.g., using an FEC technique with more redundant information).
  Changing physical layer parameters (e.g., modulation rate and/or type).
  Changing protocol parameters (e.g., by breaking a frame up into several shorter frames).
  Increasing transmit power.

The first three prior art techniques suffer from one or more of the following limitations:
  Requiring a change to an existing and/or standardized protocol.
  Incompatibility with previously deployed devices.
  Reduction in available data bandwidth.

Increasing transmission power is an effective technique to improve the reliability of frame delivery. This technique, however, is often not practical or possible for one or more of the following reasons:
  Regulatory limits imposed by local authorities.
  Limits imposed by applicable industry standards.
  Practical limits on power or energy (e.g., cost and/or size).

Accordingly, it is desirable to have a communications receiver that improves frame delivery over impaired channels without suffering from the above limitations.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

According to one embodiment, a first corrupted frame is received and stored in a buffer. Subsequently, a second corrupted frame is received. The receiver attempts to recover the second corrupted frame by combining bits from the first and second corrupted frame to generate a recovered frame. The recovered frame is generated based on frame information of the second corrupted frame, e.g., probability indicators indicating the probability of data bits of the second corrupted frame being correct. In one embodiment, the recovered frame is generated based on frame information of the first corrupted frame, e.g., probability indicators indicating the probability of data bits of the first corrupted frame being correct. In one embodiment, multiple recovered frames are generated (based on probability indicators) for each received corrupted frame until a recovered frame is generated that passes a predetermined error detection mechanism. Alternatively, multiple recovered frames are generated (based on probability indicators) until a predetermined attempt threshold has been reached. In one embodiment, in order to minimize the risk of passing along a corrupted frame that passes error detection, frame recovery is attempted only if certain filters (i.e., predetermined conditions) are satisfied. A recovered frame that passes the predetermined error detection mechanism is treated as if it was an error-free received frame.

Figure 1:
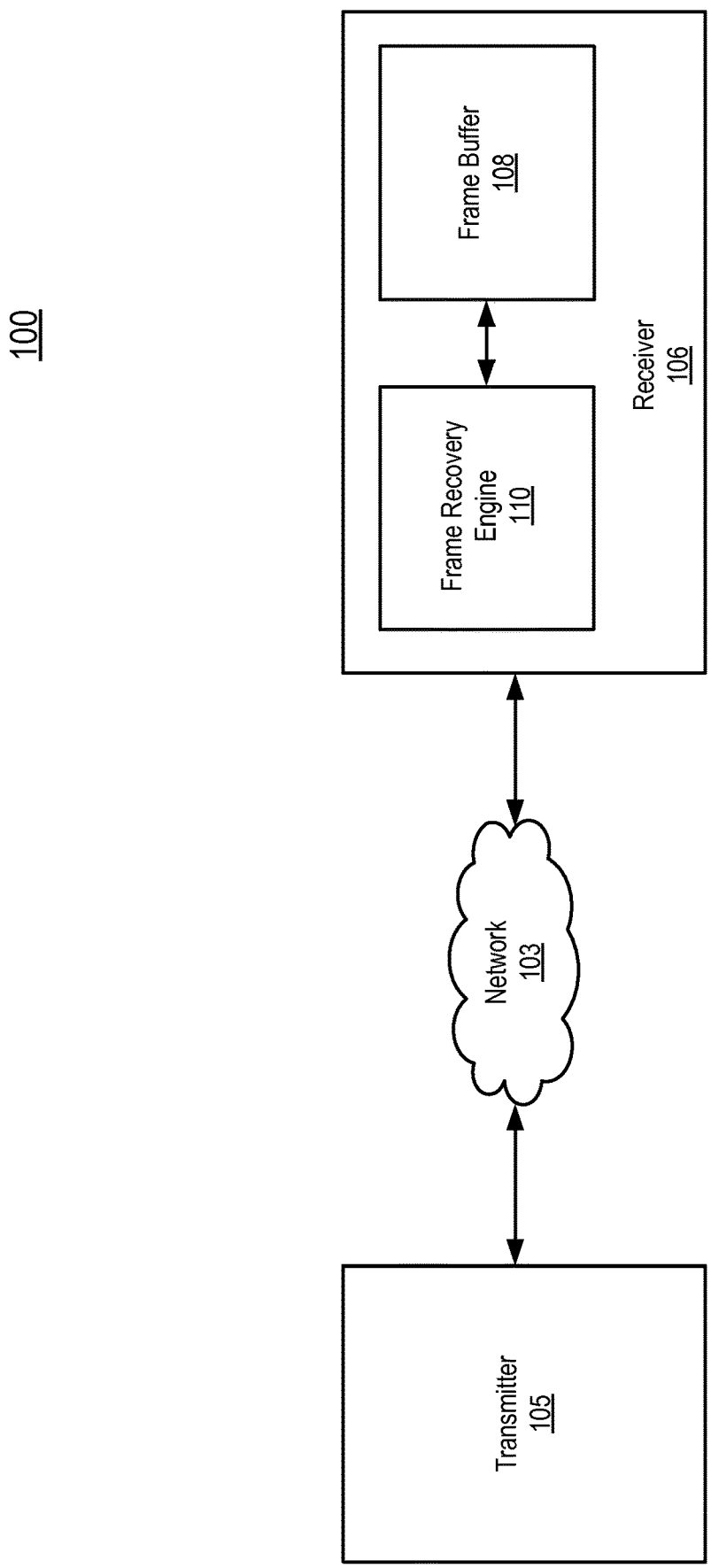
FIG. 1 is a block diagram illustrating a communications system according to one embodiment.

FIG. 1 is a block diagram illustrating a communications system 100 comprising of transmitter 105 configured to transmit data to receiver 106 over network 103. FIG. 1 illustrates one transmitter communicatively coupled to one receiver. System 100, however, may include other devices communicatively coupled to each other over network 103. Furthermore, system 100 is illustrated as having a transmitter and receiver. It shall be understood, however, that transmitter 105 is not limited to transmitting, and receiver 106 is not limited to receiving. In a duplex system, both transmitter 105 and receiver 106 are capable of transmitting and receiving. Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless.

In one embodiment, system 100 is a "control network", such as a power line communications system. For example, transmitter 105 may send information regarding power of one or more locations to receiver 106. Receiver 106, likewise, may also be configured to send information regarding power of one or more locations to transmitter 105. In another embodiment, system 100 is a "data network", where data/ messages from a higher layer in a protocol stack (not shown) is commonly broken (i.e., segmented) into "frames" prior to being transmitted by a transmitter. At the receiver end, frames are received and "reassembled" back into a single data unit. The assembled data unit is passed along to a higher layer in the protocol stack at the receiver. Data is fragmented into frames for several reasons, e.g., it is easier and more efficient to manage small frames of data rather than the entire, larger data unit. By way of example, under some conditions, by the time a frame is received, it may become corrupted. Corruption may be, for example, the result of channel impairments and/or transmission collisions between multiple devices. Rather than retransmitting the entire large data unit, it is more efficient to simply retransmit the corrupted frame. The above discussion of breaking data/ messages into frames is only intended for illustrative purposes, and not intended to be a limitation of the present frame recovery mechanisms. The frame recovery mechanisms described herein are equally applicable in communications systems where a single frame corresponds to one or more entire messages.

Embodiments of frame recovery are described herein which further optimizes a communications system. The frame recovery mechanisms enable a receiver to determine the frame that was intended to be received, thus, avoiding the need for the transmitter to retransmit the corrupted frame. Receiver 106 includes frame recovery engine (FRE) 110 for recovering received corrupted frames. Frame recovery is performed based on information of a newly received corrupted frame and optionally based on information of a previously received frame. The newly and/or previously received corrupted frame may be stored in frame buffer 108. Various embodiments of frame recovery shall be become apparent through the discussion of the figures below.

References are made to the sequence/order in which frames are received. It will be understood that a "newly received" frame is a frame that is received latest in time. A "previously received" frame is a frame that was received at some point in time prior to the "newly received" frame. There may be zero or more frames between when the "newly received" and the "previously received" frame. A "newly received" frame may simply be referred to as a "received" frame.

Figure 2:
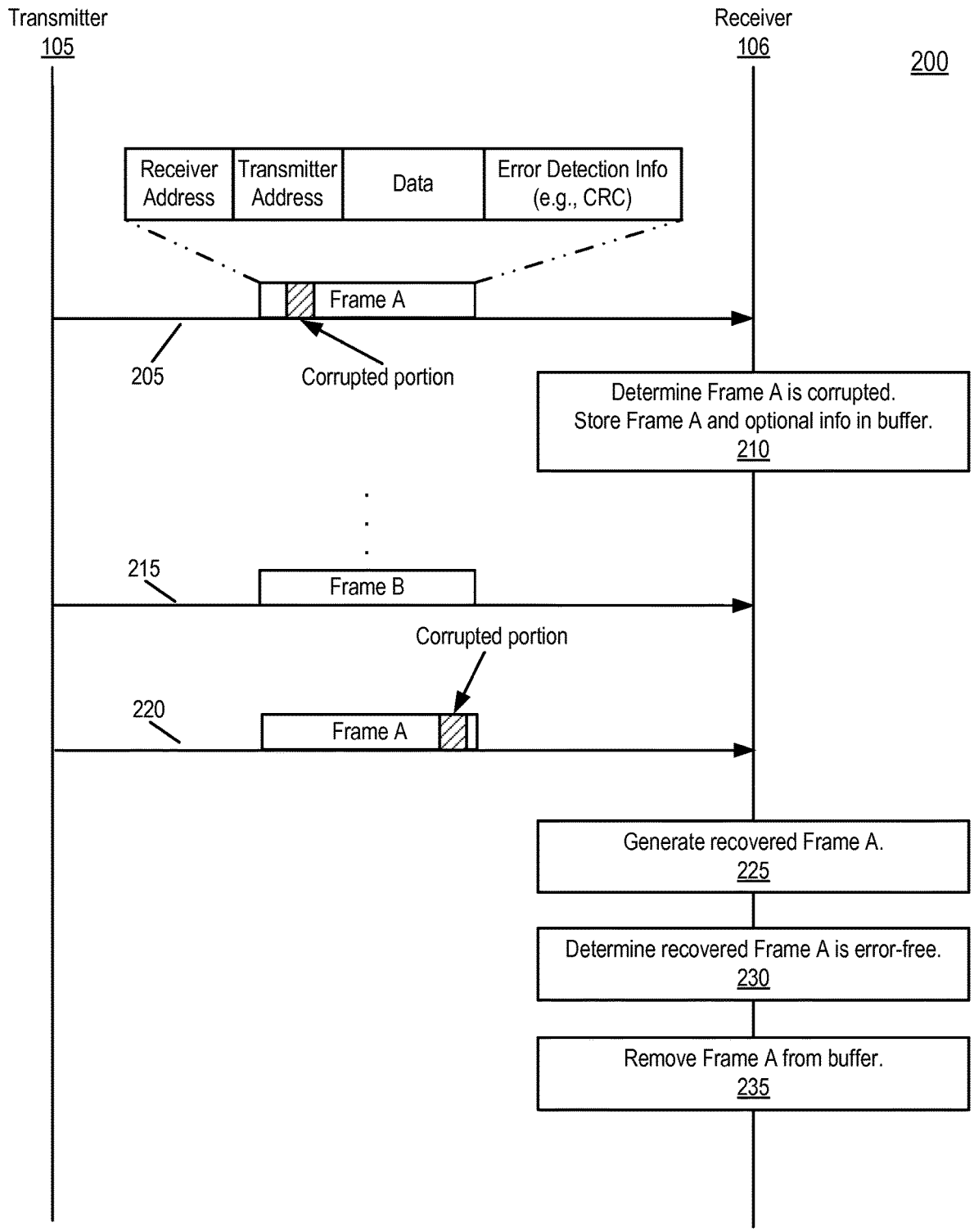
FIG. 2 is a transaction diagram illustrating a process flow for performing frame recovery according to one embodiment.

FIG. 2 is a transaction diagram illustrating a processing flow 200 for recovering a frame transmitted by transmitter 105 which is corrupted by the time it arrives at receiver 106. At transaction 205, transmitter 105 sends frame A to receiver 106. A frame is a collection of fields. Each field is made up of, at the lowest level, a collection of bits. In one embodiment, a frame includes, but is not limited to, a receiver address for identifying the intended receiver of the frame. For example, the receiver address may be a media access controller (MAC) address of the intended receiver. In the example as illustrated by flow 200, the receiver address is the address of receiver 106. In some embodiments, a frame includes a transmitter address identifying the transmitter that transmitted the frame, e.g., the transmitter address may be a MAC address of the transmitter. In the example as illustrated by flow 200, the transmitter address is the address of transmitter 105. In one embodiment, a frame also includes data (commonly known as "payload"). In order for the integrity of a frame to be evaluated by the receiver, a frame often includes error detection information, such as cyclic redundancy check (CRC) information.

During transaction 205, as frame A is transmitted to receiver 106, a portion (i.e., one or more bits of the frame) is corrupted. During operation 210, receiver 106 receives the corrupted version of frame A, which remains corrupted even after FEC has been applied. The FEC may be implemented as part of receiver 106, or more generally, as part of system 100. Receiver 106 determines, based on a predetermined error detecting mechanism (e.g., by evaluating the CRC of frame A), that frame A is corrupted. As a result, receiver 106 discards/drops the frame. Receiver 106 determines that frame recovery by combination with previously transmitted frames is not possible because no previously received corrupted frame has been stored in a local buffer, e.g., frame buffer 108. Receiver 106 stores the corrupted frame A in a buffer. Optionally, receiver 106 also stores information of frame A in the same or different buffer. In one embodiment, frame information includes probability indicators indicating the probability of each data/frame bit being correct.

At transaction 215, transmitter 105 transmits frame B, which is properly received by receiver 106 (i.e., frame B is not corrupted). At transaction 220, transmitter 105 decides to retransmit frame A (e.g., because transmitter 105 determines that frame A was corrupted during transaction 205). As illustrated by flow 200, frame A is again corrupted during transaction 220. During operation 225, because receiver 106 has information of at least one previously received corrupted frame, receiver 106 generates a "recovered" frame using information stored as part of operation 210. The recovered frame is an "estimate" by receiver 106 of what the intended frame was (i.e., frame A in its uncorrupted form).

Not all attempted recoveries of a corrupted frame will produce the intended frame. The more bits are corrupted, the less likely the recovery will be successful. Thus, in one embodiment, receiver 106 determines if the recovered frame is the intended frame by applying a predetermined error detection mechanism (e.g., by checking the CRC of the recovered frame). During operation 230, receiver 106 determines that a recovered frame is error-free based on the predetermined error detection mechanism. Receiver 106 treats the error-free recovered frame as a frame received without any corruption. Optionally, at operation 235, receiver 106 removes from buffer the corrupted frame A and corresponding frame information stored during operation 210. By removing the corrupted frame from buffer, receiver 106 decreases the risk of erroneously recovering a frame.

The transactions of FIG. 2 are only intended for illustrative purposes. The recovery mechanisms described herein are not limited to the illustrated transactions and/or operations of processing flow 200. For example, the frame recovery mechanisms do not require transaction 215 to occur (i.e., frame B does not have to be transmitted). On the other hand, the frame recovery mechanisms described herein are equally applicable even if multiple of such transactions 215 occur (i.e., multiple frames may be transmitted between a previously transmitted frame A at transaction 205 and a newly received corrupted frame A during transaction 220).

Figure 3:
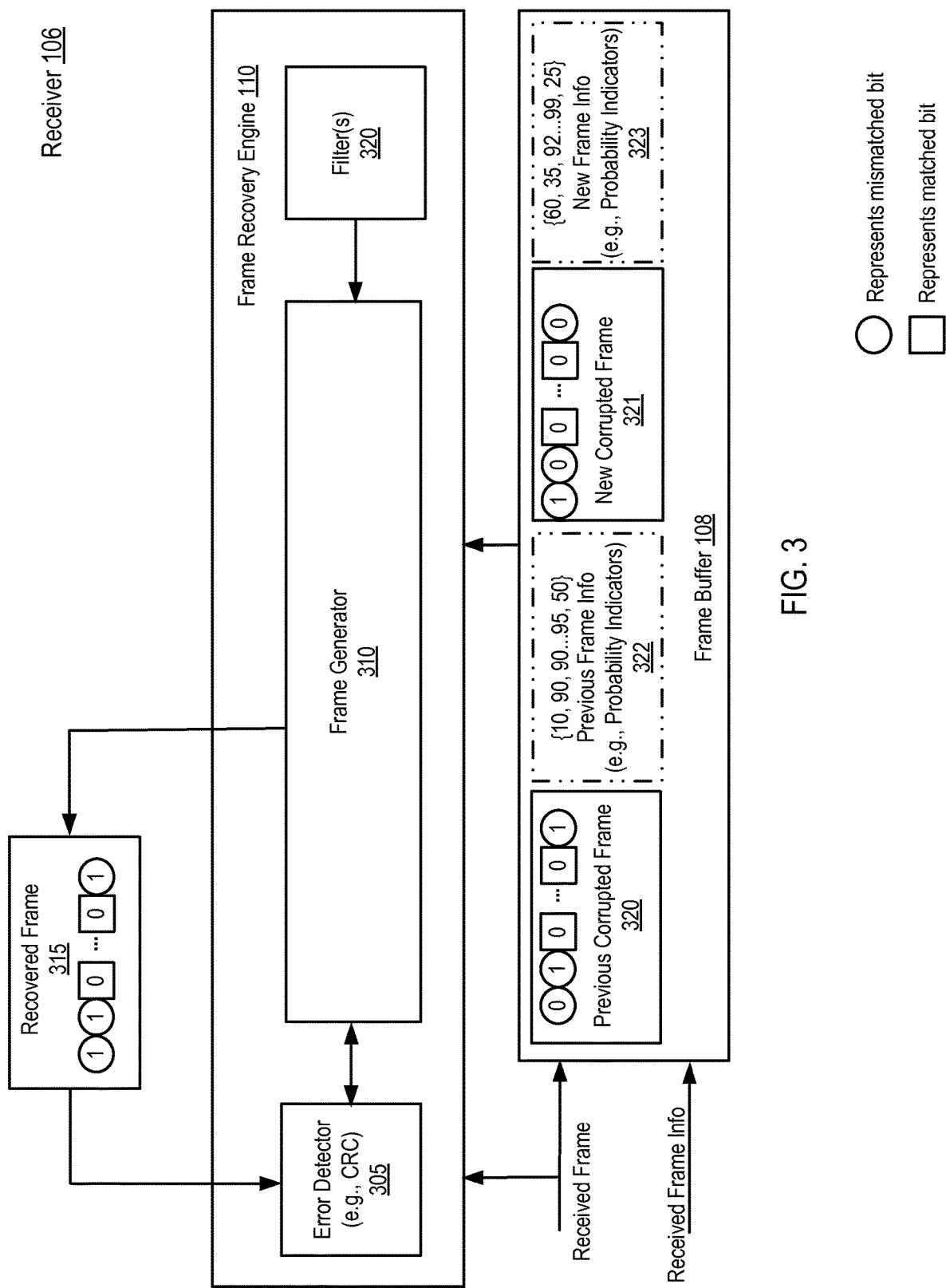
FIG. 3 is a block diagram illustrating a communications receiver according to one embodiment.

FIG. 3 is a block diagram illustrating an embodiment of receiver 106, which may be implemented as processing logic in software, hardware, or any combination thereof. According to one embodiment, frame buffer 108 is configured to store one or more received corrupted frames and, optionally, their corresponding frame information. For example, frame buffer 108 may be configured to store (e.g., as part of operation 210 of FIG. 2) a previously received corrupted frame 320 (e.g., frame A of transaction 205 of FIG. 2). In one embodiment, frame buffer 108 is also configured to store information relating to previously received corrupted frame 320. For example, frame buffer 108 may be configured to store frame information (e.g., probability indicators) 322 of previously received corrupted frame 320. Probability indicators (e.g., numerical values) indicate the probability of each corresponding bit of a corresponding frame being correct. The indicators may be in any predetermined unit, e.g., each indicator may represent a percentage value. As described herein, the indicators shall be referred to as having a "unit".

By way of example, as illustrated in FIG. 3, previously received corrupted frame 320 includes bits having the values {0, 1, 0 . . . 0, 1}, and corresponding probability indicators 322 having the values {10, 90, 90 . . . 95, 50}. Thus, frame information 322 indicates there is a 10 unit chance that the first bit of frame 320 is a "0" and a 50 unit chance that the fifth bit of frame 320 is a "1".

In one embodiment, frame buffer 108 is also configured to store a second frame and its corresponding frame information. For example, frame buffer 108 may be configured to store a newly received corrupted frame 321 (e.g., retransmitted frame A of transaction 220 of FIG. 2). In one embodiment, frame buffer 108 is configured to store frame information 323 (e.g., probability indicators) corresponding to corrupted frame 321. As illustrated, newly received corrupted frame 321 includes bits having the values {1, 0, 0 . . . 0, 0} and corresponding probability indicators 323 having the values 160, 35, 92 . . . 99, 251. Thus, there is a 60 unit chance that the first bit of the newly received corrupted frame 321 is a "1", and a 25 unit chance that the fifth bit of the newly received corrupted frame is a "0".

Although FIG. 3 illustrates frame buffer 108 storing frame information 322-323 for corrupted frames 320-321, respectively, in some embodiments, due to constraints on resources, frame information 322 is not stored (as denoted by the dashed line). Moreover, in some embodiments, not all frame information are stored for corrupted frame 321 (as denoted by the dashed line). In other words, frame information 323 may contain only information for a subset of the corrupted frame 321. For example, frame information 323 stored in frame buffer 108 may include only a predetermined number of the lowest probability indicators, such that the number of indicators stored is less than the number of bits in the corresponding corrupted frame 321.

Receiver 106 includes FRE 110 for recovering received corrupted frames. FRE 110 includes, but is not limited to, error detector 305 for determining if a received frame is corrupted. Error detector 305 may be implemented as any predetermined error detection mechanism. For example, error detector 305 may be implemented as a CRC checker, which includes logic for computing a CRC of a received frame and comparing the computed CRC against the CRC embedded in the received frame to determine frame integrity. Other predetermined error detection mechanisms may be implemented as part of error detector 305.

FRE 110 includes frame generator 310 configured to generate a recovered frame 315 in response to error detector 305 determining that newly received corrupted frame 321 is corrupted. For example, frame generator 310 may "combine" (i.e., merge) one or more bits of previously received corrupted frame 320 with corresponding bits of newly received corrupted frame 321. In one embodiment, recovered frame 315 is generated based frame information 323, and optionally, frame information 322. (Details are provided below in the discussion with respect to FIGS. 4A-4C). Error detector 305 determines if recovered frame 315 passes the error detection mechanism, and if so, recovered frame 315 is treated as if it was an error-free received frame. Otherwise, recovered frame 315 is discarded (i.e., treated as if it was never received).

Error detection mechanisms, such as CRCs, have a high probability of detecting corrupted frames. They are not, however, completely immune from producing false positives (i.e., corrupted frames may sometimes pass the error detection mechanism). For example, in the context of CRCs, a corrupted frame having one or more flipped/inverted bit(s) may sometimes still result in a frame having a valid CRC. In some embodiments, in order to limit the probability of passing along a corrupted frame that passes the error detection test, frame generator 310 is configured to attempt frame recovery only if all the conditions/requirements of filter(s) 320 have been satisfied. In one embodiment, filter(s) 320 includes the requirement that the frame length of the newly received corrupted frame and previously received corrupted frame matches, or mismatches within a predetermined tolerable difference. While this filter is not necessary (e.g., it would be possible to combine the overlapping portions of the shorter of the two corrupted frames), applying the equal length filter may be the best choice in a number of cases, depending on the probability of false positives associated with the defined error detection mechanism.

In one embodiment, filter(s) 320 includes the requirement of matching source and/or destination addresses between the corrupted frames in consideration. In one embodiment, filter(s) 320 includes the requirement that the time between potential frames to be combined were received within a particular time window. For example, if previously received frame 320 has become "stale" by the time newly received corrupted frame 321 is received, filter(s) 320 prevents frame generator 310 from attempting frame recovery. In one embodiment, the time window is configurable. In one embodiment, the time window is configured based on system characteristics, such as repeat frame timing parameters. In one embodiment, filter(s) 320 includes the requirement of no intervening uncorrupted frames. For example, filter(s) 320 prevents frame generator 310 from attempting frame recovery if one or more uncorrupted frames is received between newly received corrupted frame 321 and previously received corrupted frame 320. In an alternate embodiment, filter(s) 320 permits frame recovery even if one or more uncorrupted frames is received between corrupted frames 321-322, but only if the number of received uncorrupted frames is less than a predetermined threshold.

In one embodiment, filter(s) 320 includes one or more probability thresholds that can be set such that only combined frames with error free probabilities above the threshold are acted upon, e.g., by subjecting it to the error detection mechanism, and if it passes the error detection test, treating it as if it was a validly received frame. In one embodiment, the probability thresholds are based on the weighted sum of individual bit probability indicators. In another embodiment, the thresholds are based on other indicators such as signal strength, noise level, or degree of match between received and expected, or allowed, signals.

The above list of filters are discussed only for illustrative purposes, and not intended to be a limitation of the present frame recovery mechanisms. For example, frame generator 310 may be configured to attempt frame recovery without regards to any of the discussed filters. Where one or more filters are implemented, they may each be configurable, i.e., selectively enabled/used. Alternatively, all filters may be globally enabled via a single configurable switch. The list of filters discussed is not exhaustive, and other filters may be implemented without departing from the broader spirit and scope of the invention.

Figure 4A:
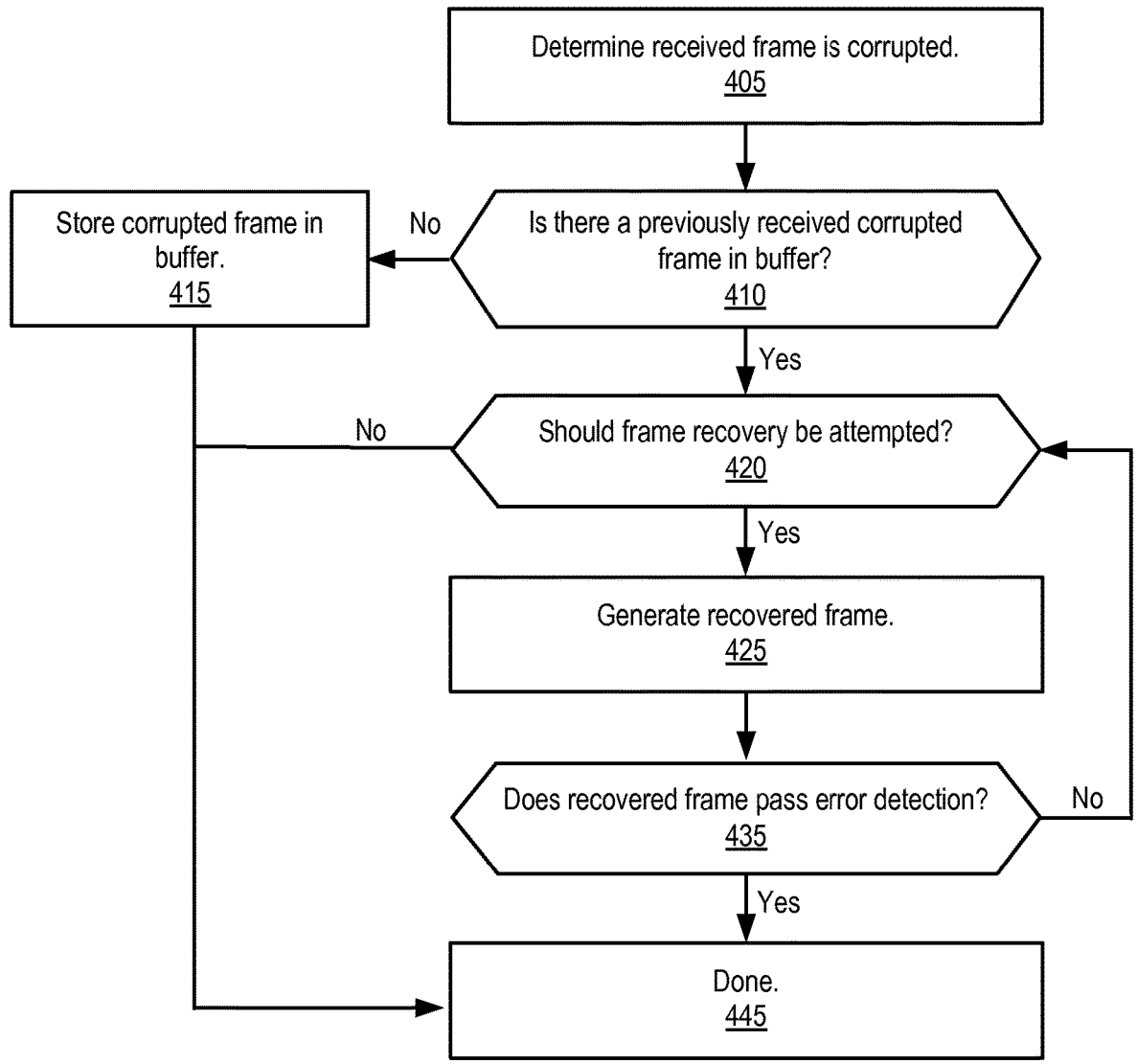
FIG. 4A is a flow diagram illustrating a method for performing frame recovery according to one embodiment.

FIG. 4A is a flow diagram illustrating method 400 for recovering a received corrupted frame according to one embodiment of receiver 106. For example, method 400 may be performed by receiver 106 of FIG. 2, such as error detector 305 and frame generator 310. Method 400 may be implemented as processing logic in software, hardware, or any combination thereof.

At block 405, the receiver determines a received frame is corrupted. For example, after a frame is received, error detector 305 determines that the received frame is corrupted, and notifies frame generator 310 of such an event. At block 410, the receiver determines if a previously received corrupted frame is stored in a local buffer. For example, frame generator 310 determines if frame buffer 108 contains at least one corrupted frame (e.g., corrupted frame 320) and its corresponding frame information (e.g., frame information 322).

At block 415, in response to determining that the local buffer does not contain any previously received corrupted frame, the receiver stores the received corrupted frame in the buffer. For example, in response to determining that frame buffer 108 does not contain at least one corrupted frame, frame generator 310 stores the received corrupted frame (e.g., as corrupted frame 320). Optionally, frame generator 310 stores the frame information (e.g., as part of frame information 322) of the received corrupted frame in frame buffer 108. Because there is no previously received corrupted frame stored in frame buffer 108 prior to the newly received corrupted frame, frame generator 310 completes its processing at block 445, without attempting to recover the newly received corrupted frame. Thus, in the case where a corrupted frame does not exist in frame buffer 108 prior to the current/newly received corrupted frame, blocks 420-435 are not performed. In the case where a corrupted frame has been previously stored in buffer 108, blocks 420-435 are performed.

At block 420, in response to determining that the local buffer contains a previously received corrupted frame, the receiver determines if recovery of the newly received corrupted frame should be attempted. For example, frame generator 310 determines whether to perform frame recovery based on filter(s) 320. If one or more of filter(s) 320 indicates that attempted frame recovery is not likely beneficial, the process is completed at block 445.

At block 425, in response to determining that none of filter(s) 320 are enabled, or alternatively, all enabled filter(s) 320 indicates that attempted frame recovery is likely beneficial, the receiver attempts frame recovery by generating a recovered frame. For example, frame generator generates recovered frame 315 based on stored frames 320-321 and optionally based on their respective frame information 322-323. At block 435, the receiver determines if the recovered frame passes the predetermined error detection mechanism. For example, error detector 305 determines if recovered frame 315 passes the error detection mechanism. If the recovered frame passes the error detection mechanism, the process is completed at block 445, and recovered frame 315 is treated as a validly received frame (i.e., error-free).

In response to determining that the recovered frame does not pass the error detection mechanism, the receiver determines if further frame recovery should be attempted by returning/looping back to block 420. As discussed above, at block 420, frame generator 310 determines if (another) frame recovery should be attempted based on filter(s) 320. For example, frame generator 310 determines if another recovered frame should be generated for the received corrupted frame based on filter(s) 320. If the number of recovery attempts has exceeded the threshold as indicated by filter(s) 320 (i.e., another frame recovery should not be attempted) frame generator 310 completes the process at block 445. Otherwise, frame generator 310 performs another frame recovery iteration by transitioning to block 425.

Figure 4B:
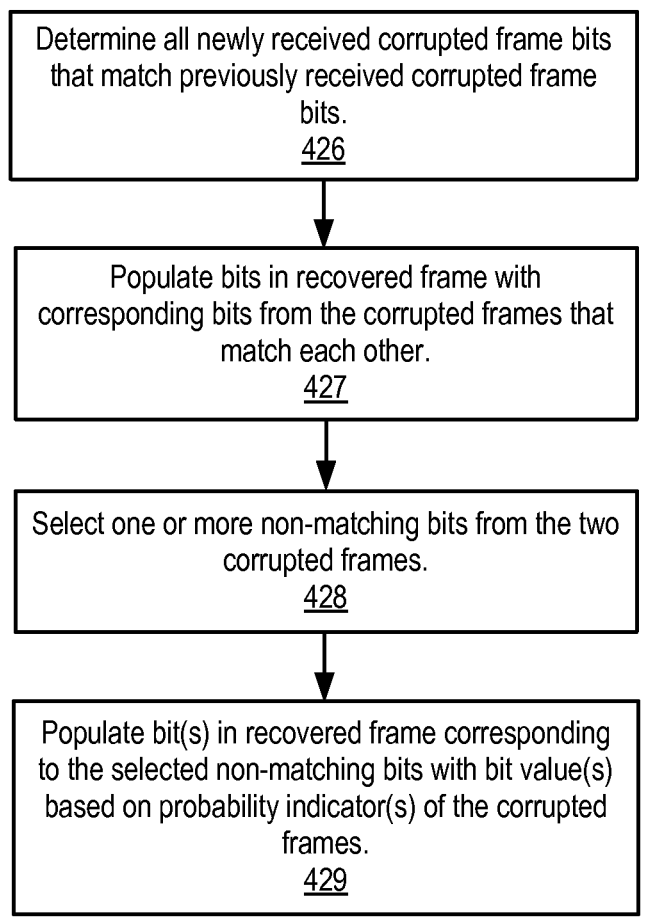
FIG. 4B is a flow diagram illustrating a method for generating a recovered frame.

FIG. 4B is a flow diagram illustrating method 401 for generating a recovered frame according to one embodiment. For example, method 401 may be implemented as part of block 425 of method 400 of FIG. 4A. In other words, method 401 may be performed (i.e., invoked) for each iteration that block 425 of method 400 is performed. FIG. 4B will be discussed with references made to FIG. 3 and FIG. 4A. In particular, references will be made with respect to the order of bits of the frames in FIG. 3. In shall be understood that the bit ordering is referenced with respect to the illustration, and not necessarily the order in which the bits appear in a frame. For example, reference to a "fourth" bit of corrupted frames 320-321 simply refers to the fourth bit as illustrated in FIG. 3, and not necessarily a fourth bit in the frames. In other words, there may be one or more bits between the third and fourth bit in the actual frames 320-321. Likewise, there may be one or more probability indicators between the third and fourth probability indicators in frame information 322-323.

At block 426, the receiver determines all newly received corrupted frame bits that match previously received corrupted frame bits. For example, frame generator 310 scans through previously received corrupted frame 320 and newly received corrupted frame 321 in frame buffer 108 to find all bits that match between the two corrupted frames. As illustrated in FIG. 3, frame generator 310 determines that the two corrupted frames have matching bits with respect to the third and fourth bit (as illustrated) starting from the left (which have the bit values {0, 0}, respectively).

At block 427, the receiver populates bits in a recovered frame with the corresponding bit from the corrupted frames that match each other. For example, frame generator 310 populates bits in recovered frame 315 with the corresponding bits from the corrupted frames 320-321 that match each other. As illustrated in FIG. 3, frame generator 310 populates the third and fourth bit (as illustrated) of recovered frame 315 with the corresponding third and fourth bit (as illustrated) from corrupted frame 320 (or corrupted frame 321) because both corrupted frames have the bit values {0, 0} for the third and fourth bit, respectively.

At block 428, the receiver selects one or more non-matching bits from the two corrupted frames. For example, frame generator 310 selects one or more bits from corrupted frame 320 that does not match corresponding bit(s) in corrupted frame 321. As illustrated in FIG. 3, the first, second, and fifth, bit of the two corrupted frames do not match with each other. As such, frame generator 310 selects one or more of such non-matching bits for processing. For example, frame generator 310 selects all non-matching bits for processing during the first iteration, i.e., during the first time method 401 is invoked.

At block 429, the receiver populates bit(s) in the recovered frame corresponding to the selected non-matching bits with bit value(s) based on the probability indicators of the corrupted frames. For example, frame generator 310 populates bit(s) in recovered frame 315 corresponding to the bits of corrupted frames 320-321 that do not match with each other. Frame generator 310 populates the bit(s) in recovered frame 315 with bit value(s) based on probability indicator(s)

of frame information 322-323. Continuing on with the above example, during the first iteration, frame generator 310 populates all bits in recovered frame 315 corresponding to the non-matching bits with values based probability indicators. In this particular example, the first bit of recovered frame 315 is populated with a bit value "1" (corresponding to the first bit of corrupted frame 321) because the corresponding first probability indicator of frame information 323 has a value of "60", which is higher/greater than the first probability indicator of frame information 322, which only has a value of "10". Frame generator 310 populates the second bit of recovered frame 315 with the value of the second bit of corrupted frame 320 (i.e., a "1"), because the second probability indicator of frame information 322 is "90," which is higher than the second probability indicator of frame information 323, which only has a value of "35." Frame generator 310 populates the fifth bit of recovered frame 315 with the value of the fifth bit of corrupted frame 320 (i.e., a "1"), because the fifth probability indicator of frame information 322 is "50", which is higher than the fifth probability indicator of frame information 323, which only has a value of "25." Thus, in this example, after block 429 is performed during the first iteration, recovered frame 315 has the bit values {1, 1, 0 . . . 0, 1}. Again, reference to a "fifth" bit or "fifth" probability indicator is not to be understood as the actual "fifth" bit in the frame or "fifth" probability indicator in the frame information. As denoted by the " . . . " between the third and fourth bit/indicator in FIG. 3, there may be one or more bits/indicators between the third and fourth bit/indicator.

If a recovered frame does not pass the error detection mechanism, frame generator 310 may perform further frame recovery if permitted (e.g., by filter(s) 320 at block 420 of method 400). For example, if the recovered frame generated during the first iteration above does not pass error detection, frame generator 310 may generate another recovered frame by invoking method 401 during subsequent iteration(s). In one embodiment, during a subsequent iteration, frame generator 310 flips/inverts one or more of the non-matching bits that were selected during the previous iteration. In such an embodiment, the bit(s) to be inverted is the bit having the lowest probability indicator among the bits selected in the previous iteration. In one embodiment, in order to prevent looping between lowest probability indicators, frame generator 310 does not flip the same bit in subsequent iterations until all bits have been flipped. In one embodiment, in subsequent iterations, frame generator 310 flips combinations of two or more non-matching bits having the lowest probability indicators. In yet another embodiment, during a subsequent iteration, frame generator 310 flips bits that have been determined to be matching (e.g., at block 426).

Blocks 428 and 429 may be implemented such that multiple non-matching bits are selected for processing during each iteration. In such an embodiment, a different combination of bits may be selected such that a bit selected in a previous iteration may be re-selected for processing during the current/subsequent iteration. Method 401 is illustrated in FIG. 4B as a sequence of operations. Not all operations, however, are required to be performed during each iteration. For example, method 401 may be implemented such that blocks 426-427 are only performed during the first iteration.

In some instances, system resource limitations (e.g., finite memory) may preclude storing both a complete copy of a corrupted frame as well as full probability information for each data bit of the frame. Thus, in one embodiment, receiver 106 is configured to store only the data bit values of a first corrupted frame (e.g., previously received corrupted frame 320), without storing any associated probability information (e.g., frame information 322). In such an embodiment, generation of recovered frame 315 is based only stored frame information 323 of newly received corrupted frame 321. Details of this embodiment shall become apparent through the discussion of FIG. 4C.

Figure 4C:
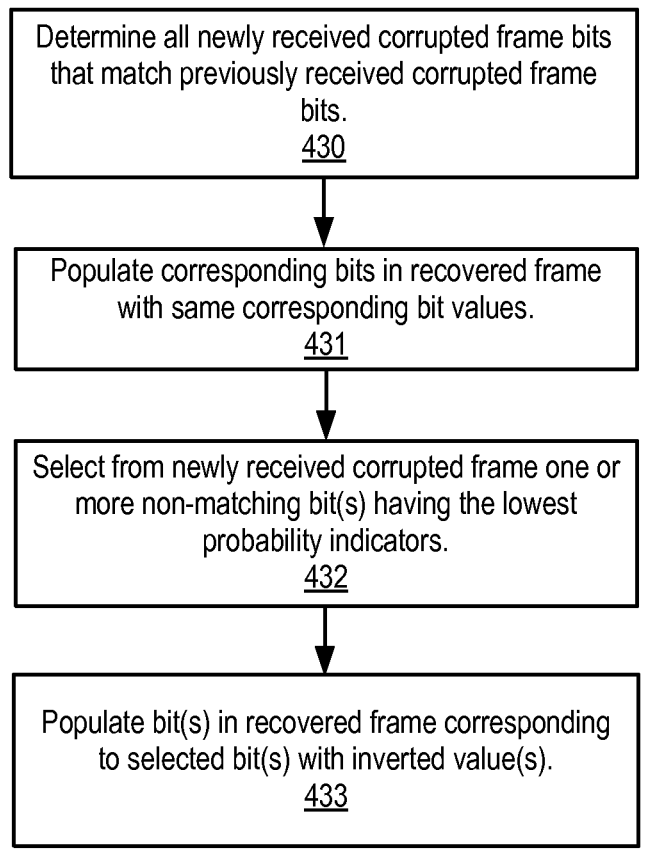
FIG. 4C is a flow diagram illustrating a method for generating a recovered frame.

FIG. 4C is a flow diagram illustrating method 402 for generating a recovered frame according to one embodiment. For example, method 402 may be implemented as part of block 425 of method 400 of FIG. 4A. In other words, method 402 may be performed (i.e., invoked) for each iteration that block 425 of method 400 is performed. FIG. 4C will be discussed with references made to FIG. 3 and FIG. 4A.

At block 430, the receiver determines all newly received corrupted frame bits that match previously received corrupted frame bits. For example, frame generator 310 scans through previously received corrupted frame 320 and newly received corrupted frame 321 in frame buffer 108 to find all bits that match between the two corrupted frames. As illustrated in FIG. 3, frame generator 310 determines that the two corrupted frames have matching bits with respect to the third and fourth bit starting from the left (which have the bit values {0, 0}, respectively).

At block 431, the receiver populates bits in a recovered frame with the corresponding bit from the corrupted frames that match each other. For example, frame generator 310 populates bits in recovered frame 315 with the corresponding bits from the corrupted frames 320-321 that match each other. As illustrated in FIG. 3, frame generator 310 populates the third and fourth bit of recovered frame 315 with the corresponding third and fourth bit from corrupted frame 320 (or corrupted frame 321) because both corrupted frames have the bit values {0, 0} for the third and fourth bit, respectively.

At block 432, the receiver selects from the newly received corrupted frame one or more non-matching bit(s) having the lowest probability indicators. For example, frame generator 310 selects bits from newly received corrupted frame 321 that do not match corresponding bits of previously received corrupted frame 320. Of these selected non-matching bits, frame generator 310 selects one or more bits from corrupted frame 321 having the lowest probability indicators.

As illustrated in FIG. 3, the frame bits of previously received corrupted frame 320 that do not match with frame bits of newly received corrupted frame 321 are the first, second, and fifth frame bits. The first, second, and fifth frame bit of newly received corrupted frame 321 have probability indicators of "60," "35," and "25," respectively (as indicated frame information 323). Of these probability indicators, the lowest indicator is the fifth indicator having the value "25," which corresponds to the fifth bit of newly received corrupted frame 321. The second lowest probability indicator is "35," which corresponds to the second data bit of corrupted frame 321. The third lowest probability indicator is the first indicator having the value "60," which corresponds to the first bit of newly received corrupted frame 321.

Referring still to block 432, frame generator 310 selects one or more of these non-matching bits for processing. For example, frame generator 310 selects the fifth data bit for processing (because it has the lowest probability indicator) during the first iteration (i.e., during the first time method 401 is invoked). During the second iteration, frame generator 310 selects the second bit of newly received corrupted frame 321 for processing (because it has the second lowest probability indicator). During the third iteration, frame generator 310 selects the first bit of newly received corrupted frame 321 for processing (because it has the third lowest probability indicator).

At block 433, the receiver populates bit(s) in the recovered frame corresponding to the bits selected at block 432 with the inverted values of the corresponding selected bit. For example, frame generator 310 populates bit(s) in recovered frame 315 corresponding to the bit(s) selected at block 432 with inverted value(s) of the selected bit(s). As illustrated in FIG. 3, during the first iteration, frame generator 310 populates the fifth bit of recovered frame 315 with a bit value "1" (which is the inverted value of the fifth frame bit of newly received corrupted frame 321, i.e., "0"). Thus, after the first iteration, recovered frame 315 has the bit values {x, x, 0 . . . 0, 1}, where "x" may be a fixed value that is predetermined. In one embodiment, the predetermined value is the value of the corresponding mismatched bit of newly received corrupted frame 321. In another embodiment, the predetermined value is the value corresponding to the mismatched bit of previously received corrupted frame 320. In another embodiment, "x" is a value that is randomly selected by frame generator 310. If the recovered frame does not pass the error detection mechanism, e.g., as determined at block 435 of method 400 of FIG. 4A, method 400 may required a second iteration to be performed by method 402.

Continuing further with the above example, during the second iteration, frame generator 310 selects the second data bit for processing (because it has the second lowest probability indicator). As illustrated in FIG. 3, frame generator 310 populates the second bit of recovered frame 315 with a bit value of "1" (which is the inverted value of the second bit of newly received corrupted frame 321, i.e., "0"). Thus, after the second iteration, recovered frame 315 has the bit values {x, 1, 0 . . . 0, 1}, where "x" may be a fixed value that is predetermined. In one embodiment, the predetermined value is the value of the corresponding mismatched bit of newly received corrupted frame 321. In another embodiment, the predetermined value is the value corresponding to the mismatched bit of previously received corrupted frame 320. In another embodiment, "x" is a value that is randomly selected by frame generator 310. If the recovered frame does not pass the error detection mechanism, e.g., as determined at block 435 of method 400 of FIG. 4A, method 400 may required a third iteration to be performed by method 402, and so on until a recovered frame is generated which passes the error detection mechanism, or until one of filter(s) 320 at block 420 of method 400 indicates that further iterations are not to be preformed (e.g., because a recovery attempt threshold has been reached).

Blocks 432-433 may be implemented such that multiple non-matching bits are selected for processing during each iteration. In such an embodiment, a different combination of bits may be selected such that a bit selected in a previous iteration may be re-selected for processing. Method 402 is illustrated in FIG. 4C as a sequence of operations. Not all operations, however, are required to be performed during each iteration. For example, method 402 may be implemented such that blocks 430-431 are only performed during the first iteration.

Resource limitations may also preclude information for all bits of the newly (i.e., most recently) received frame from being stored in memory (e.g., there may be insufficient space in frame buffer 108). In order to reduce the need to store the probability information for all bits of the newly (i.e., most recently) received frame, the following process may be implemented. Using the method described below by way of example, probability information for only the bits with the lowest probability of being correct are stored.

By way of example, as the incoming signal is processed and receiver 106 evaluates the probability that a bit is correct (e.g., by evaluating phase or amplitude relative to other bits, or to expected values) the first bit value, and its probability of being correct is stored. Additionally, a pointer to indicate that this stored information corresponds to the first data bit of the frame is also stored. The receiver does the same thing for the next two bits of the frame by storing the bit value, probability indicator, and location pointer of each bit. At this point all three allocated memory units are utilized.

The receiver processes the fourth and subsequent frame bits. If the receiver finds a frame bit with a lower probability of being correct (i.e., weaker bit) the stored information corresponding to the least-weak stored frame bit (i.e., the strongest of the three weakest stored bits) is replaced with the information corresponding to the newly processed weaker frame bit. By repeating this process for each frame bit through the end of the frame, the frame bit values, probabilities, and locations of the three weakest bits of the received frame are retained.

If the error detection mechanism determines that this newly received frame is corrupted, a recovered frame can be constructed using, first, all matching bits between the previously received and newly received corrupted frames. For bit locations where the previously and newly received corrupted frames differ, the location with the weakest bit of the newly received frame could be inverted. This frame could then be evaluated by the error detection mechanism. If it is found to be error free, it can be treated as a valid frame. If it is determined that the frame is still corrupted, then other combined frames can be constructed and evaluated based on flipping the next weakest mismatched bit(s), individually, and then in combinations with each other. The above example illustrates the storing (and using) of three lowest probability indicators for generating a recovered frame. The mechanism, however, is not so limited and can be applied to store more or less probability indicators.

In one embodiment, the frame recovery mechanisms discussed herein are performed online (i.e., "on-the-fly"). For example, as a newly received frame arrives at receiver 106, recovered frame 315 may be constructed as the received data bits are stored. In such an embodiment, receiver 106 initially presumes the newly received frame is corrupted. At the end of the frame reception, recovered frame 315 is discarded if the received frame turns out to be error-free. In such an embodiment, bandwidth (such as system bus access bandwidth) may be optimized by avoiding having to store the newly received frame and then reading it back for processing.

The online processing embodiment suffers from the drawback of processing all frames even though some or even all received frames are error-free. Accordingly, in another embodiment, receiver 106 performs post processing on the newly received frame after it has been determined to be corrupted. In such an embodiment, receiver 106 fetches the stored corrupted frame from buffer only if it is determined to be corrupted. The disadvantage of this embodiment, however, is that it incurs an additional latency as compared to the online mode. In other words, it requires more time from the moment a corrupted frame is received to the moment a recovered frame is generated.

In one embodiment, receiver 106 is preconfigured to perform frame recovery either in online or post processing mode. In an alternate embodiment, receiver 106 is configured to dynamically switch between the online and post processing mode based on systems characteristics (e.g., the extent of channel impairment and/or the tolerable latency in recovering a corrupted frame). The tolerable latency may vary on a frame by frame basis. For example, a frame from a "video streaming" application may require lower latency than a frame from a "web browsing" session. Accordingly, in some embodiments, receiver 106 is able to dynamically switch between the online and post processing mode on a frame by frame basis. For example, receiver 106 may determine a received frame has a low latency requirement based on the source address of the received frame, and/or based on some other characteristics embedded in the received frame. As such, it may be necessary for receiver 106 to store sufficient bits from a received frame to determine if online or post processing mode should be applied to the frame.

The frame recovery mechanisms discussed above involves evaluating the probability indicators to determine the bit values of a recovered frame. In some instances, there may be two or more probability indicators having the same value. In some embodiments where multiple probability indicators have the same value, receiver 106 is configured to construct a recovered frame for one or more of such equally probable frames. The frame recovery mechanisms have been discussed with respect to generating a recovered frame from two corrupted frames. The frame recovery mechanisms, however, are not so limited. The mechanisms discussed herein are equally applicable in combining three or more corrupted frames.

Figure 5:
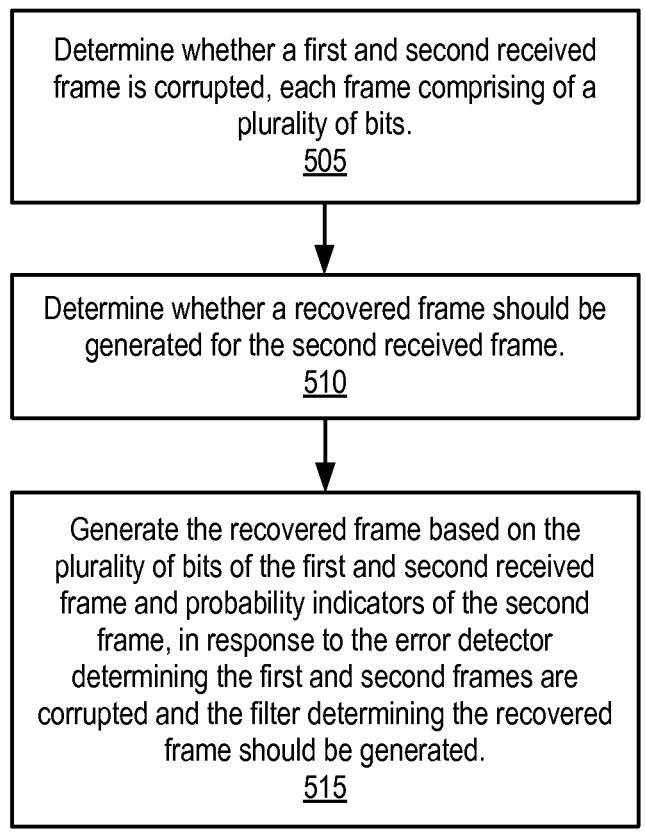
FIG. 5 is a flow diagram illustrating a method for performing frame recovery according to one embodiment.

FIG. 5 is a flow diagram illustrating method 500 for recovering a received corrupted frame according to one embodiment. For example, method 500 may be performed by receiver 106 of FIG. 3, such as error detector 305 and frame generator 310. At block 505, the error detector determines whether a first and second received frame is corrupted, each frame including a plurality of bits. At block 510, the filter determines whether a recovered frame should be generated for the second received frame. For example, filter(s) 320 determines if recovered frame 315 should be generated for newly received corrupted frame 321 based on whether all the requirements/conditions have been satisfied.

At block 515, the frame generator generates the recovered frame based on the plurality of bits of the first and second received frame, and additionally, based on probability indicators of the second received frame. The receiver generates the recovered frame in response to the error detector determining the first and second received frames are corrupted, and the filter determining the recovered frame should be generated for the second received frame. For example, frame generator 310 determines all bits in previously received corrupted frame 320 that match corresponding bits in newly received corrupted frame 321. Frame generator 310 populates bits in recovered frame 315 with corresponding matching bits from newly received corrupted frame 321 (or corrupted frame 320).

With respect to non-matching bits, frame generator 310 populates one or more bits in recovered frame 315 corresponding to the one or more non-matching bits based on probability indicators of the newly received corrupted frame (i.e., frame information 323). For example, for the non-matching bit in the second received frame having the lowest probability indicator, frame generator 310 inverts the bit and populates a corresponding bit in recovered frame 310 with the inverted bit value.

Various embodiments and aspects of the inventions have been described with reference to the drawings. The description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions. The frame recovery mechanisms have been discussed with respect to a receiver. The mechanisms are not limited. For example, in duplex communications systems, the frame recovery mechanisms of the present invention may be implemented in any device within the system.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed:

1. A communications receiver comprising:
an error detector for determining whether a first and second received frame are corrupted, each frame comprising of a plurality of bits;
a filter for determining whether the second received frame should be recovered; and
a frame generator for generating a recovered frame based on the plurality of bits of the first and second received frames and a plurality of probability indicators of the second frame, in response to the error detector determining the first and second received frames are corrupted and the filter determining that the second received frame should be recovered, wherein each of the plurality of probability indicators indicates a probability of a corresponding bit of the second frame being correct.

2. The communications receiver of claim 1, wherein for each bit of the second received frame that matches a corresponding bit of the first received frame, the frame generator populates a corresponding bit in the recovered frame with a bit value of the matching bit.

3. The communications receiver of claim 1, wherein for a first bit of the second received frame that does not match a corresponding first bit of the first received frame, the frame generator populates a corresponding first bit in the recovered frame with a bit value based on a first probability indicator of the first received frame and a first probability indicator of the second received frame.

4. The communications receiver of claim 1, wherein the frame generator populates a bit in the recovered frame with an inverted value of the corresponding bit in the second received frame.

5. The communications receiver of claim 4, wherein the bit to be populated is selected from a second set of one or more bits having the lowest probability indicators, wherein the second set of one or more bits is selected from a first set of one or more bits of the second received frame that does not match a corresponding bit of the first received frame.

6. The communications receiver of claim 1, wherein the filter determines whether to recover the second received frame based on a predetermined relationship between a length of the second received frame and a length of the first received frame.

7. The communications receiver of claim 1, wherein the filter determines whether to recover the second received frame based on a predetermined relationship between a destination address of the first received frame a destination address of the second received frame.

8. The communications receiver of claim 1, wherein the filter determines whether to recover the second received frame based on a time period between when the first frame was received and the when the second frame was received.

9. The communications receiver of claim 1, wherein the filter determines whether to recover the second received frame based on whether a number of recovery attempts for the second received frame has reached a predetermined attempt threshold.

10. The communications receiver of claim 1, wherein the recovered frame is evaluated by the error detector to determine if the recovered frame is corrupted, in response to the filter determining that a sum of individual indicators of the recovered frame exceeds a predetermined probability threshold.

11. A method implemented in a communications receiver for recovering received corrupted frames, the method comprising:
determining, by an error detector circuitry, whether a first and second received frame are corrupted, each frame comprising of a plurality of bits;
determining, by a filter circuitry, whether a recovered frame should be generated for the second received frame; and
generating, by a frame generator circuitry the recovered frame based on the plurality of bits of the first and second received frames and a plurality of probability indicators of the second frame, in response to the error detector circuitry determining that the first and second received frames are corrupted and the filter circuitry determining that the recovered frame should be generated, wherein each of the plurality of probability indicators indicates a probability of a corresponding bit of the second frame being correct.

12. The method of claim 11, wherein for each bit of the second received frame that matches a corresponding bit of the first received frame, the frame generator circuitry populates a corresponding bit in the recovered frame with a bit value of the matching bit.

13. The method of claim 11, wherein for a first bit of the second received frame that does not match a corresponding first bit of the first received frame, the frame generator circuitry populates a corresponding first bit in the recovered frame with a bit value based on a first probability indicator of the first received frame and a first probability indicator of the second received frame.

14. The method of claim 11, wherein the frame generator circuitry populates a bit in the recovered frame with an inverted value of the corresponding bit in the second received frame.

15. The method of claim 14, wherein the bit to be populated is selected from a second set of one or more bits having the lowest probability indicators, wherein the second set of one or more bits is selected from a first set of one or more bits of the second received frame that does not match a corresponding bit of the first received frame.

16. The method of claim 11, wherein the filter circuitry determines whether to recover the second received frame based on a predetermined relationship between a length of the second received frame and a length of the first received frame.

17. The method of claim 11, wherein the filter circuitry determines whether to recover the second received frame based on a predetermined relationship between a destination address of the first received frame a destination address of the second received frame.

18. The method of claim 11, wherein the filter circuitry determines whether to recover the second received frame based on a time period between when the first frame was received and the when the second frame was received.

19. The method of claim 11, wherein the filter circuitry determines whether to recover the second received frame based on whether a number of recovery attempts for the second received frame has reached a predetermined attempt threshold.

20. The method of claim 11, wherein the recovered frame is evaluated by the error detector circuitry to determine if the recovered frame is corrupted, in response to the filter circuitry determining that a sum of individual indicators of the recovered frame exceeds a predetermined probability threshold.

21. A communications system including a transmitter and a receiver, the receiver comprising:
 an error detector for determining whether a first and second received frame are corrupted, each frame comprising of a plurality of bits;
 a filter for determining whether the second received frame should be recovered; and
 a frame generator for generating a recovered frame based on the plurality of bits of the first and second received frames and a plurality of probability indicators of the second frame, in response to the error detector determining that the first and second received frames are corrupted and the filter determining that the second received should be recovered, wherein each of the plurality of probability indicators indicates a probability of a corresponding bit of the second frame being correct.

22. The communications system of claim 21, wherein for each bit of the second received frame that matches a corresponding bit of the first received frame, the frame generator populates a corresponding bit in the recovered frame with a bit value of the matching bit.

23. The communications system of claim 21, wherein for a first bit of the second received frame that does not match a corresponding first bit of the first received frame, the frame generator populates a corresponding first bit in the recovered frame with a bit value based on a first probability indicator of the first received frame and a first probability indicator of the second received frame.

24. The communications system of claim 21, wherein the frame generator populates a bit in the recovered frame with an inverted value of the corresponding bit in the second received frame.

25. The communications system of claim 24, wherein the bit to be populated is selected from a second set of one or more bits having the lowest probability indicators, wherein the second set of one or more bits is selected from a first set of one or more bits of the second received frame that does not match a corresponding bit of the first received frame.

26. The communications system of claim 21, wherein the filter determines whether to recover the second received frame based on a predetermined relationship between a length of the second received frame and a length of the first received frame.

27. The communications system of claim 21, wherein the filter determines whether to recover the second received frame based on a predetermined relationship between a destination address of the first received frame a destination address of the second received frame.

28. The communications system of claim 21, wherein the filter determines whether to recover the second received frame based on a time period between when the first frame was received and when the second frame was received.

29. The communications system of claim 21, wherein the filter determines whether to recover the second received frame based on whether a number of recovery attempts for the second received frame has reached a predetermined attempt threshold.

30. The communications system of claim 21, wherein the recovered frame is evaluated by the error detector to determine if the recovered frame is corrupted, in response to the filter determining that a sum of individual indicators of the recovered frame exceeds a predetermined probability threshold.

* * * * *